United States Patent
Oren

(10) Patent No.: US 9,643,774 B2
(45) Date of Patent: May 9, 2017

(54) PROPPANT STORAGE VESSEL AND ASSEMBLY THEREOF

(71) Applicant: Oren Technologies, LLC, Houston, TX (US)

(72) Inventor: John Oren, Houston, TX (US)

(73) Assignee: OREN TECHNOLOGIES, LLC, Houston, TX (US)

( * ) Notice: Subject to any disclaimer, the term of this patent is extended or adjusted under 35 U.S.C. 154(b) by 0 days.

(21) Appl. No.: 15/285,105

(22) Filed: Oct. 4, 2016

(65) Prior Publication Data
US 2017/0021997 A1    Jan. 26, 2017

Related U.S. Application Data

(63) Continuation of application No. 15/191,578, filed on Jun. 24, 2016, now Pat. No. 9,511,929, which is a
(Continued)

(51) Int. Cl.
*B65D 88/02* (2006.01)
*B65D 88/32* (2006.01)
(Continued)

(52) U.S. Cl.
CPC .......... *B65D 88/022* (2013.01); *B65D 25/08* (2013.01); *B65D 88/32* (2013.01); *B65D 88/542* (2013.01);
(Continued)

(58) Field of Classification Search
CPC .... B65D 88/022; B65D 90/10; B65D 88/542; B65D 90/02; B65D 90/12; B65D 25/08;
(Continued)

(56) References Cited

U.S. PATENT DOCUMENTS

| 137,871 A | 4/1873 | Worsley |
| 150,894 A | 5/1874 | Safely |

(Continued)

FOREIGN PATENT DOCUMENTS

| EP | 322283 | 6/1989 |
| EP | 0997607 | 5/2003 |

(Continued)

OTHER PUBLICATIONS

International Search Report for related International Application No. PCT/US2012/066639, Feb. 25, 2013.
(Continued)

*Primary Examiner* — Donnell Long
(74) *Attorney, Agent, or Firm* — Hogan Lovells US LLP

(57) ABSTRACT

A proppant storage vessel has a container having a first end wall, a second end wall, a first side wall, a second side wall, a top wall and a bottom wall. The first and second end walls extend between opposite ends of the first and second side walls. The walls define an interior volume of the container. The walls have a rigidity suitable for retaining no less than 30,000 pounds of proppant therein. A top hatch is formed centrally on the top wall and is movable between an open position and a closed position. A bottom hatch is formed generally centrally on the bottom wall of the container and is movable between an open position and a closed position.

14 Claims, 4 Drawing Sheets

Related U.S. Application Data continuation of application No. 14/831,905, filed on Aug. 21, 2015, now Pat. No. 9,403,626, which is a continuation of application No. 13/949,693, filed on Jul. 24, 2013, now Pat. No. 9,296,518, which is a continuation-in-part of application No. 13/660,840, filed on Oct. 25, 2012, now Pat. No. 8,505,780, which is a continuation of application No. 13/332,937, filed on Dec. 21, 2011, now Pat. No. 8,827,118, application No. 15/285,105, filed on Oct. 4, 2016, which is a continuation of application No. 15/191,592, filed on Jun. 24, 2016, now Pat. No. 9,527,664, which is a continuation of application No. 14/831,905, filed on Aug. 21, 2015, now Pat. No. 9,403,626, which is a continuation of application No. 13/949,693, filed on Jul. 24, 2013, now Pat. No. 9,296,518, which is a continuation-in-part of application No. 13/660,840, filed on Oct. 25, 2012, now Pat. No. 8,505,780, which is a continuation of application No. 13/332,937, filed on Dec. 21, 2011, now Pat. No. 8,827,118.

(51) Int. Cl.
- *B65D 90/14* (2006.01)
- *B65D 25/08* (2006.01)
- *B65D 88/54* (2006.01)
- *B65D 90/02* (2006.01)
- *B65D 90/12* (2006.01)
- *B65G 65/40* (2006.01)
- *B65D 90/10* (2006.01)
- *B65G 65/42* (2006.01)

(52) U.S. Cl.
CPC ............ *B65D 90/02* (2013.01); *B65D 90/10* (2013.01); *B65D 90/12* (2013.01); *B65D 90/14* (2013.01); *B65G 65/40* (2013.01); *B65G 65/42* (2013.01)

(58) Field of Classification Search
CPC ........ B65D 90/14; B65D 88/32; B65G 65/42; B65G 65/40
USPC .............................................. 222/143, 185.1
See application file for complete search history.

(56) References Cited

U.S. PATENT DOCUMENTS

| | | |
|---|---|---|
| 384,443 A | 6/1888 | Hoover |
| 448,238 A | 3/1891 | Johnson |
| 711,632 A | 10/1902 | Johnson |
| 917,649 A | 4/1909 | Otto |
| 1,143,641 A | 6/1915 | McGregor |
| 1,331,883 A | 2/1920 | Stuart |
| 1,344,768 A | 6/1920 | Messiter |
| 1,434,488 A | 11/1922 | Forsythe et al. |
| 1,520,560 A | 12/1923 | Burno |
| 1,506,936 A | 9/1924 | Lea |
| 1,526,527 A | 2/1925 | Butler |
| 1,573,664 A | 2/1926 | Wetherill |
| 1,807,447 A | 5/1931 | Smith |
| 1,850,000 A | 3/1932 | Fernand |
| 1,932,320 A | 10/1933 | Steward |
| 1,973,312 A | 9/1934 | Hardinge |
| 2,233,005 A | 2/1941 | Garlinghouse |
| 2,293,160 A | 8/1942 | Miller et al. |
| 2,368,672 A | 2/1945 | McNamara |
| 2,381,103 A | 8/1945 | Frank |
| 2,423,879 A | 7/1947 | De Frees |
| 2,564,020 A | 8/1951 | Mengel |
| 2,603,342 A | 7/1952 | Martinson |
| 2,616,758 A | 11/1952 | Meyers |
| 2,622,771 A | 12/1952 | Tulou |
| 2,652,174 A | 9/1953 | Shea et al. |
| 2,678,145 A | 5/1954 | Ejuzwiak et al. |
| 2,693,282 A | 11/1954 | Sensibar |
| 2,700,574 A | 1/1955 | Tourneau |
| 2,792,262 A | 4/1955 | Hathom |
| 2,774,515 A | 12/1956 | Johansson et al. |
| 2,791,973 A | 5/1957 | Dorey |
| 2,801,125 A | 7/1957 | Page et al. |
| 2,808,164 A | 10/1957 | Glendinning |
| 2,812,970 A | 11/1957 | Martinson |
| 2,837,369 A | 6/1958 | Stopps |
| 2,865,521 A | 12/1958 | Fisher et al. |
| 2,873,036 A | 2/1959 | Noble |
| 2,894,666 A | 7/1959 | Campbell, Jr. |
| 2,988,235 A | 6/1961 | Ronyak |
| 2,994,460 A | 8/1961 | Matthews |
| 3,049,248 A | 8/1962 | Heltzel et al. |
| 3,064,832 A | 11/1962 | Heltzel |
| 3,083,879 A | 4/1963 | Coleman |
| 3,090,527 A | 5/1963 | Rensch |
| 3,109,389 A | 11/1963 | Karlsson |
| 3,122,258 A | 2/1964 | Raymond |
| 3,135,432 A | 6/1964 | McKinney |
| 3,163,127 A | 12/1964 | Gutridge et al. |
| 3,187,684 A | 6/1965 | Ortner |
| 3,198,494 A | 8/1965 | Curran et al. |
| 3,199,585 A | 8/1965 | Cronberger |
| 3,248,026 A | 4/1966 | Kemp |
| 3,255,927 A | 6/1966 | Ruppert et al. |
| 3,265,443 A | 8/1966 | Simas |
| 3,270,921 A | 9/1966 | Nadolske et al. |
| 3,281,006 A | 10/1966 | Tonchung |
| 3,294,306 A | 12/1966 | Areddy |
| 3,318,473 A | 5/1967 | Jones et al. |
| 3,353,599 A | 11/1967 | Swift |
| 3,354,918 A | 11/1967 | Coleman |
| 3,378,152 A | 4/1968 | Warner |
| 3,387,570 A | 6/1968 | Pulcrano et al. |
| 3,396,675 A | 8/1968 | Stevens |
| 3,397,654 A | 8/1968 | Snyder |
| 3,406,995 A | 10/1968 | McCarthy |
| 3,407,971 A | 10/1968 | Oehler |
| 3,425,599 A | 2/1969 | Sammamo et al. |
| 3,455,474 A | 7/1969 | Truncali |
| 3,524,567 A | 8/1970 | Coleman |
| 3,528,570 A | 9/1970 | Pase |
| 3,561,633 A | 2/1971 | Morrison et al. |
| 3,587,834 A | 6/1971 | Dugge |
| 3,596,609 A | 8/1971 | Ortner |
| 3,601,244 A | 8/1971 | Ort et al. |
| 3,602,400 A | 8/1971 | Cooke |
| 3,650,567 A | 3/1972 | Danielson |
| 3,653,521 A | 4/1972 | Bridge |
| 3,661,293 A | 5/1972 | Gerhard et al. |
| 3,692,363 A | 9/1972 | Tenebaum et al. |
| 3,704,797 A | 12/1972 | Suykens |
| 3,721,199 A | 3/1973 | Hassenauer |
| 3,729,121 A | 4/1973 | Cannon |
| 3,734,215 A | 5/1973 | Smith |
| 3,738,511 A | 6/1973 | Lemon et al. |
| 3,777,909 A | 12/1973 | Rheinfrank |
| 3,785,534 A | 1/1974 | Smith |
| 3,800,712 A | 4/1974 | Krug, Jr. |
| 3,802,584 A | 4/1974 | Sackett |
| 3,817,261 A | 6/1974 | Rogge |
| 3,820,762 A | 6/1974 | Bostrom et al. |
| 3,840,141 A | 10/1974 | Allom et al. |
| 3,854,612 A | 12/1974 | Snape |
| 3,861,716 A | 1/1975 | Baxter et al. |
| 3,883,005 A | 5/1975 | Stevens |
| 3,933,100 A | 1/1976 | Dugge |
| 3,970,123 A | 7/1976 | Poulton et al. |
| 3,986,708 A | 10/1976 | Heltzel et al. |
| 3,997,089 A | 12/1976 | Clarke et al. |
| 4,003,301 A | 1/1977 | Norton |
| 4,004,700 A | 1/1977 | Empey |
| 4,057,153 A | 11/1977 | Weaver |
| 4,058,239 A | 11/1977 | Van Mill |
| 4,063,656 A | 12/1977 | Lambert |

(56) References Cited

U.S. PATENT DOCUMENTS

| | | |
|---|---|---|
| 4,073,410 A | 2/1978 | Melcher |
| 4,138,163 A | 2/1979 | Calvert et al. |
| 4,178,117 A | 12/1979 | Brugler |
| 4,204,773 A | 5/1980 | Bates |
| 4,210,273 A | 7/1980 | Hegele |
| 4,210,963 A | 7/1980 | Ricciardi et al. |
| RE30,358 E | 8/1980 | Sensibar |
| 4,222,498 A | 9/1980 | Brock |
| 4,227,732 A | 10/1980 | Kish |
| 4,232,884 A | 11/1980 | DeWitt |
| 4,239,424 A | 12/1980 | Pavolka |
| 4,247,228 A | 1/1981 | Gray et al. |
| 4,258,953 A | 3/1981 | Johnson |
| 4,265,266 A | 5/1981 | Kierbow et al. |
| 4,278,190 A | 7/1981 | Oory et al. |
| 4,282,988 A | 8/1981 | Hulbert, Jr. |
| 4,287,921 A | 9/1981 | Sanford |
| 4,287,997 A | 9/1981 | Rolfe et al. |
| 4,289,353 A | 9/1981 | Merritt |
| 4,329,106 A | 5/1982 | Adler |
| 4,350,241 A | 9/1982 | Wenzel |
| 4,359,176 A | 11/1982 | Johnson |
| 4,363,396 A | 12/1982 | Wolf et al. |
| 4,397,406 A | 8/1983 | Croley |
| 4,398,653 A | 8/1983 | Daloisio |
| 4,402,392 A | 9/1983 | Fabian et al. |
| 4,407,202 A | 10/1983 | McCormick |
| 4,408,886 A | 10/1983 | Sampson et al. |
| 4,410,106 A | 10/1983 | Kierbow et al. |
| 4,427,133 A | 1/1984 | Kierbow et al. |
| 4,428,504 A | 1/1984 | Bassett et al. |
| 4,449,861 A | 5/1984 | Saito et al. |
| 4,453,645 A | 6/1984 | Usui et al. |
| 4,474,204 A | 10/1984 | West |
| 4,475,672 A | 10/1984 | Whitehead |
| 4,478,155 A | 10/1984 | Cena et al. |
| 4,483,462 A | 11/1984 | Heintz |
| 4,525,071 A | 6/1985 | Horowitz |
| 4,532,098 A | 7/1985 | Campbell et al. |
| 4,569,394 A | 2/1986 | Sweatman et al. |
| 4,571,143 A | 2/1986 | Hellerich |
| 4,608,931 A | 9/1986 | Ruhmann et al. |
| 4,619,531 A | 10/1986 | Dunstan |
| 4,626,155 A | 12/1986 | Hlinsky et al. |
| 4,626,166 A | 12/1986 | Jolly |
| 4,628,825 A | 12/1986 | Taylor et al. |
| 4,660,733 A | 4/1987 | Snyder et al. |
| 4,701,095 A | 10/1987 | Berryman et al. |
| 4,715,754 A | 12/1987 | Scully |
| 4,738,774 A | 4/1988 | Patrick |
| 4,741,273 A | 5/1988 | Sherwood |
| 4,801,389 A | 1/1989 | Brannon et al. |
| 4,819,830 A | 4/1989 | Schultz |
| 4,848,605 A | 7/1989 | Wise |
| 4,882,784 A | 11/1989 | Tump |
| 4,889,219 A | 12/1989 | Key |
| 4,901,649 A | 2/1990 | Fehrenbach et al. |
| 4,909,378 A | 3/1990 | Webb |
| 4,909,556 A | 3/1990 | Koskinen |
| 4,917,019 A | 4/1990 | Hesch et al. |
| 4,919,583 A | 4/1990 | Speakman, Jr. |
| 4,923,358 A | 5/1990 | Van Mill |
| 4,946,068 A | 8/1990 | Erickson et al. |
| 4,947,760 A | 8/1990 | Dawson et al. |
| 4,954,975 A | 9/1990 | Kalata |
| 4,956,821 A | 9/1990 | Fenelon |
| 4,975,205 A | 12/1990 | Sloan |
| 4,995,522 A | 2/1991 | Barr |
| 5,004,400 A | 4/1991 | Handke |
| 5,042,538 A | 8/1991 | Wiese |
| 5,069,352 A | 12/1991 | Harbolt et al. |
| 5,080,259 A | 1/1992 | Hadley |
| 5,102,281 A | 4/1992 | Handke |
| 5,102,286 A | 4/1992 | Fenton |
| 5,105,858 A | 4/1992 | Levinson |
| 5,131,524 A | 7/1992 | Uehara |
| 5,190,182 A | 3/1993 | Copas et al. |
| 5,195,861 A | 3/1993 | Handke |
| 5,199,826 A | 4/1993 | Lawrence |
| 5,201,546 A | 4/1993 | Lindsay |
| 5,224,635 A | 7/1993 | Wise |
| 5,253,746 A | 10/1993 | Friesen et al. |
| 5,253,776 A | 10/1993 | Decroix et al. |
| 5,265,763 A | 11/1993 | Heinrici et al. |
| 5,286,158 A | 2/1994 | Zimmerman |
| 5,290,139 A | 3/1994 | Hedrick |
| 5,320,046 A | 6/1994 | Hesch |
| 5,324,097 A | 6/1994 | DeCap |
| 5,339,996 A | 8/1994 | Dubbert |
| 5,358,137 A | 10/1994 | Shuert et al. |
| 5,373,792 A | 12/1994 | Pileggi et al. |
| 5,402,915 A | 4/1995 | Hogan |
| 5,413,154 A | 5/1995 | Hurst et al. |
| 5,429,259 A | 7/1995 | Robin |
| 5,441,321 A | 8/1995 | Karpisek |
| 5,465,829 A | 11/1995 | Kruse |
| 5,470,175 A | 11/1995 | Jensen et al. |
| 5,493,852 A | 2/1996 | Stewart |
| 5,538,286 A | 7/1996 | Hoff |
| 5,549,278 A | 8/1996 | Sidler |
| 5,564,599 A | 10/1996 | Barber et al. |
| 5,570,743 A | 11/1996 | Padgett et al. |
| 5,590,976 A | 1/1997 | Kilheffer et al. |
| 5,601,181 A | 2/1997 | Lindhorst |
| 5,602,761 A | 2/1997 | Spoerre et al. |
| 5,613,446 A | 3/1997 | DiLuigi et al. |
| 5,617,974 A | 4/1997 | Sawyer |
| 5,647,514 A | 7/1997 | Toth et al. |
| RE35,580 E | 8/1997 | Heider et al. |
| 5,667,298 A | 9/1997 | Musil |
| 5,687,881 A | 11/1997 | Rouse et al. |
| 5,690,466 A | 11/1997 | Gaddis et al. |
| 5,697,535 A | 12/1997 | Coleman |
| 5,706,614 A | 1/1998 | Wiley et al. |
| 5,718,555 A | 2/1998 | Swalheim |
| 5,722,552 A | 3/1998 | Olson |
| 5,761,854 A | 6/1998 | Johnson et al. |
| 5,762,222 A | 6/1998 | Liu |
| 5,772,390 A | 6/1998 | Walker |
| 5,782,524 A | 7/1998 | Heider et al. |
| 5,785,421 A | 7/1998 | Milek |
| 5,803,296 A | 9/1998 | Olson |
| 5,806,863 A | 9/1998 | Heger et al. |
| 5,836,480 A | 11/1998 | Epp et al. |
| 5,845,799 A | 12/1998 | Deaton |
| 5,876,172 A | 3/1999 | Di Rosa |
| 5,906,471 A | 5/1999 | Schwoerer |
| 5,911,337 A | 6/1999 | Bedeker |
| 5,927,558 A | 7/1999 | Bruce |
| 5,971,219 A | 10/1999 | Karpisek |
| 6,002,063 A | 12/1999 | Bilak et al. |
| 6,006,918 A | 12/1999 | Hart |
| 6,069,118 A | 5/2000 | Hinkel et al. |
| 6,077,068 A | 6/2000 | Okumura |
| 6,092,974 A | 7/2000 | Roth |
| 6,109,486 A | 8/2000 | Lee |
| 6,120,233 A | 9/2000 | Adam |
| 6,155,175 A | 12/2000 | Rude et al. |
| 6,186,654 B1 | 2/2001 | Gunteret et al. |
| 6,190,107 B1 | 2/2001 | Lanigan et al. |
| 6,192,985 B1 | 2/2001 | Hinkel et al. |
| 6,196,590 B1 | 3/2001 | Kim |
| 6,205,938 B1 | 3/2001 | Foley et al. |
| 6,247,594 B1 | 6/2001 | Garton |
| 6,263,803 B1 | 7/2001 | Dohr et al. |
| 6,269,849 B1 | 8/2001 | Fields |
| 6,283,212 B1 | 9/2001 | Hinkel et al. |
| 6,286,986 B2 | 9/2001 | Grimland |
| 6,296,109 B1 | 10/2001 | Nohl |
| 6,306,800 B1 | 10/2001 | Samuel et al. |
| 6,328,156 B1 | 12/2001 | Ostman |
| 6,328,183 B1 | 12/2001 | Coleman |
| 6,364,584 B1 | 4/2002 | Taylor |
| 6,374,915 B1 | 4/2002 | Andrews |

(56) References Cited

U.S. PATENT DOCUMENTS

| | | |
|---|---|---|
| 6,382,446 B1 | 5/2002 | Hinkle et al. |
| 6,401,983 B1 | 6/2002 | McDonald et al. |
| 6,412,422 B2 | 7/2002 | Dohr et al. |
| 6,415,909 B1 | 7/2002 | Mitchell et al. |
| 6,416,271 B1 | 7/2002 | Pigott et al. |
| 6,425,725 B1 | 7/2002 | Ehlers |
| 6,457,291 B2 | 10/2002 | Wick |
| 6,505,760 B1 | 1/2003 | Werner |
| 6,508,387 B1 | 1/2003 | Simon et al. |
| 6,508,615 B2 | 1/2003 | Taylor |
| 6,523,482 B2 | 2/2003 | Wingate |
| 6,537,002 B2 | 3/2003 | Gloystein |
| 6,575,614 B2 | 6/2003 | Tosco et al. |
| 6,660,693 B2 | 12/2003 | Miller et al. |
| 6,666,573 B2 | 12/2003 | Grassi |
| 6,675,073 B2 | 1/2004 | Kieman et al. |
| 6,705,449 B2 | 3/2004 | Wagstaffe |
| 6,720,290 B2 | 4/2004 | England et al. |
| 6,772,912 B1 | 8/2004 | Schall et al. |
| 6,774,318 B2 | 8/2004 | Beal et al. |
| 6,776,235 B1 | 8/2004 | England |
| 6,783,032 B2 | 8/2004 | Fons |
| 6,811,048 B2 | 11/2004 | Lau |
| 6,828,280 B2 | 12/2004 | England et al. |
| 6,835,041 B1 | 12/2004 | Albert |
| 6,882,960 B2 | 4/2005 | Miller |
| 6,902,061 B1 | 6/2005 | Elstone |
| 6,915,854 B2 | 7/2005 | England et al. |
| 6,953,119 B1 | 10/2005 | Wening |
| 6,955,127 B2 | 10/2005 | Taylor |
| 6,964,551 B1 | 11/2005 | Friesen |
| 6,968,946 B2 | 11/2005 | Shuert |
| 6,974,021 B1 | 12/2005 | Boevers |
| 7,008,163 B2 | 3/2006 | Russell |
| 7,051,661 B2 | 5/2006 | Herzog et al. |
| 7,084,095 B2 | 8/2006 | Lee et al. |
| 7,104,425 B2 | 9/2006 | Le Roy |
| 7,140,516 B2 | 11/2006 | Bothor |
| 7,146,914 B2 | 12/2006 | Morton et al. |
| 7,201,290 B2 | 4/2007 | Mehus et al. |
| 7,214,028 B2 | 5/2007 | Boasso |
| 7,240,681 B2 | 7/2007 | Saik |
| 7,252,309 B2 | 8/2007 | Eng Soon et al. |
| 7,284,579 B2 | 10/2007 | Elgan et al. |
| 7,316,333 B2 | 1/2008 | Wegner |
| 7,367,271 B2 | 5/2008 | Early |
| 7,377,219 B2 | 5/2008 | Brandt |
| 7,410,623 B2 | 8/2008 | Mehus et al. |
| 7,475,796 B2 | 1/2009 | Garton |
| 7,500,817 B2 | 3/2009 | Furrer et al. |
| 7,513,280 B2 | 4/2009 | Brashears et al. |
| 7,591,386 B2 | 9/2009 | Hooper |
| 7,640,075 B2 | 12/2009 | Wietgrefe |
| 7,753,637 B2 | 7/2010 | Benedict et al. |
| 7,798,558 B2 | 9/2010 | Messier |
| 7,802,958 B2 | 9/2010 | Garcia et al. |
| 7,803,321 B2 | 9/2010 | Lark et al. |
| 7,837,427 B2 | 11/2010 | Beckel |
| 7,841,394 B2 | 11/2010 | McNeel et al. |
| 7,845,516 B2 | 12/2010 | Pessin et al. |
| 7,858,888 B2 | 12/2010 | Lucas et al. |
| 7,891,304 B2 | 2/2011 | Herzog et al. |
| 7,891,523 B2 | 2/2011 | Mehus et al. |
| 7,896,198 B2 | 3/2011 | Mehus et al. |
| 7,921,783 B2 | 4/2011 | Forbes et al. |
| 7,967,161 B2 | 6/2011 | Townsend |
| 7,980,803 B2 | 7/2011 | Brandstätter et al. |
| 7,997,623 B2 | 8/2011 | Williams |
| 8,083,083 B1 | 12/2011 | Mohns |
| 8,201,520 B2 | 6/2012 | Meritt |
| 8,235,313 B2 * | 8/2012 | Ziegler ............ B02C 19/066 241/29 |
| 8,313,278 B2 | 11/2012 | Simmons et al. |
| 8,366,349 B2 | 2/2013 | Beachner |
| 8,379,927 B2 | 2/2013 | Taylor |
| 8,387,824 B2 | 3/2013 | Wietgrefe |
| 8,393,502 B2 | 3/2013 | Renyer et al. |
| 8,424,666 B2 | 4/2013 | Berning et al. |
| D688,351 S | 8/2013 | Oren |
| 8,505,780 B2 | 8/2013 | Oren |
| 8,545,148 B2 | 10/2013 | Wanek-Pusset et al. |
| 8,562,022 B2 | 10/2013 | Nadeau et al. |
| 8,573,387 B2 | 11/2013 | Trimble |
| 8,573,917 B2 | 11/2013 | Renyer |
| 8,585,341 B1 | 11/2013 | Oren |
| D694,670 S | 12/2013 | Oren |
| 8,616,370 B2 | 12/2013 | Allegretti |
| 8,622,251 B2 | 1/2014 | Oren |
| 8,646,641 B2 | 2/2014 | Moir |
| 8,668,430 B2 | 3/2014 | Oren |
| D703,582 S | 4/2014 | Oren |
| 8,820,559 B2 | 9/2014 | Beitler et al. |
| 8,827,118 B2 | 9/2014 | Oren |
| 8,887,914 B2 | 11/2014 | Allegretti |
| 8,905,266 B2 | 12/2014 | De Brabanter |
| 8,915,691 B2 | 12/2014 | Mintz |
| 9,051,801 B1 | 6/2015 | Mintz |
| 9,052,034 B1 | 6/2015 | Wegner et al. |
| 2001/0022308 A1 | 9/2001 | Epp et al. |
| 2001/0045338 A1 | 11/2001 | Ransil et al. |
| 2002/0134550 A1 | 9/2002 | Leeson et al. |
| 2002/0139643 A1 | 10/2002 | Peltier et al. |
| 2003/0111470 A1 | 6/2003 | Fouillet et al. |
| 2003/0156929 A1 | 8/2003 | Russell |
| 2004/0065699 A1 | 4/2004 | Schoer et al. |
| 2004/0074922 A1 | 4/2004 | Bothor et al. |
| 2004/0084874 A1 | 5/2004 | McDougall et al. |
| 2004/0206646 A1 | 10/2004 | Goh |
| 2004/0245284 A1 | 12/2004 | Mehus et al. |
| 2005/0158158 A1 | 7/2005 | Porta |
| 2005/0201851 A1 | 9/2005 | Jonkka |
| 2006/0012183 A1 | 1/2006 | Marchiori et al. |
| 2006/0027582 A1 | 2/2006 | Beach |
| 2006/0151058 A1 | 7/2006 | Salaoras et al. |
| 2006/0180062 A1 | 8/2006 | Furrer et al. |
| 2006/0180232 A1 | 8/2006 | Glewwe et al. |
| 2006/0239806 A1 | 10/2006 | Yelton |
| 2006/0267377 A1 | 11/2006 | Lusk et al. |
| 2006/0277783 A1 | 12/2006 | Garton |
| 2006/0289166 A1 | 12/2006 | Stromquist et al. |
| 2007/0096537 A1 | 5/2007 | Hicks |
| 2007/0125543 A1 | 6/2007 | McNeel et al. |
| 2008/0008562 A1 | 1/2008 | Beckel et al. |
| 2008/0029546 A1 | 2/2008 | Shuld |
| 2008/0029553 A1 | 2/2008 | Culleton |
| 2008/0179054 A1 | 7/2008 | McGough et al. |
| 2008/0179324 A1 | 7/2008 | McGough et al. |
| 2008/0213073 A1 | 9/2008 | Benedict et al. |
| 2008/0226434 A1 | 9/2008 | Smith et al. |
| 2008/0264641 A1 | 10/2008 | Slabaugh et al. |
| 2008/0277423 A1 | 11/2008 | Garton |
| 2009/0038242 A1 | 2/2009 | Cope |
| 2009/0078410 A1 | 3/2009 | Krenek et al. |
| 2009/0278326 A1 | 11/2009 | Rowland et al. |
| 2010/0021258 A1 | 1/2010 | Kim |
| 2010/0038143 A1 | 2/2010 | Burnett et al. |
| 2010/0040446 A1 | 2/2010 | Renyer |
| 2010/0065466 A1 | 3/2010 | Perkins |
| 2010/0108711 A1 | 5/2010 | Wietgrefe |
| 2010/0197532 A1* | 8/2010 | Rush ............ B02C 17/002 507/269 |
| 2010/0278621 A1 | 11/2010 | Redekop |
| 2010/0288603 A1 | 11/2010 | Schafer |
| 2011/0011893 A1 | 1/2011 | Cerny |
| 2011/0017693 A1 | 1/2011 | Thomas |
| 2011/0101040 A1 | 5/2011 | Weissbrod |
| 2011/0109073 A1 | 5/2011 | Williams |
| 2011/0127178 A1 | 6/2011 | Claussen |
| 2011/0160104 A1 | 6/2011 | Wu et al. |
| 2011/0162838 A1 | 7/2011 | Mackenzie et al. |
| 2011/0168593 A1 | 7/2011 | Neufeld et al. |
| 2011/0222983 A1 | 9/2011 | Dugic et al. |
| 2011/0297702 A1 | 12/2011 | Hildebrandt et al. |
| 2012/0103848 A1 | 5/2012 | Allegretti et al. |

(56) References Cited

U.S. PATENT DOCUMENTS

| | | |
|---|---|---|
| 2012/0219391 A1 | 8/2012 | Teichrob et al. |
| 2013/0004272 A1 | 1/2013 | Mintz |
| 2013/0022441 A1 | 1/2013 | Uhryn et al. |
| 2013/0206415 A1 | 8/2013 | Sheesley |
| 2013/0209204 A1 | 8/2013 | Sheesley |
| 2013/0233545 A1 | 9/2013 | Mahoney |
| 2013/0284729 A1 | 10/2013 | Cook et al. |
| 2013/0309052 A1 | 11/2013 | Luharuka |
| 2013/0323005 A1 | 12/2013 | Rexius et al. |
| 2014/0020765 A1 | 1/2014 | Oren |
| 2014/0020892 A1 | 1/2014 | Oren |
| 2014/0023465 A1 | 1/2014 | Oren et al. |
| 2014/0044507 A1 | 2/2014 | Naizer et al. |
| 2014/0083554 A1 | 3/2014 | Harris |
| 2014/0097182 A1 | 4/2014 | Sheesley |
| 2014/0166647 A1 | 6/2014 | Sheesley |
| 2014/0203046 A1 | 7/2014 | Allegretti |
| 2014/0234059 A1 | 8/2014 | Thomeer |
| 2014/0305769 A1 | 10/2014 | Eiden et al. |
| 2014/0321950 A1 | 10/2014 | Krenek et al. |
| 2015/0069052 A1 | 3/2015 | Allegretti et al. |
| 2015/0086307 A1 | 3/2015 | Stefan |

FOREIGN PATENT DOCUMENTS

| | | |
|---|---|---|
| JP | S4871029 | 9/1973 |
| JP | S4876041 | 9/1973 |
| JP | S58161888 | 10/1983 |

OTHER PUBLICATIONS

International Search Report for related International Application No. PCT/US2013/035442, Jun. 23, 2013.
International Search Report for related International Application No. PCT/US2013/032819, May 23, 2013.
International Search Report for related International Application No. PCT/US2013/049028, Mar. 4, 2014.
International Preliminary Report on Patentability for PCT/US2012/066639, Feb. 26, 2013.
International Preliminary Report on Patentability for PCT/US2013/032819, Sep. 23, 2014.
International Search Report for PCT/US2015/012990, dated May 6, 2015. (15 pages).
FS-35 Desert Frac-Sanders. NOV (National Oilwell Varco). Mar. 19, 2012. (https://web.archive.org/web/20120319070423/http://www.nov.com/Well_Service_and_Completion/Frac_Sand_Handling_Equipment/Frac_Sanders/FS-35.aspx).
File History for U.S. Appl. No. 61/538,616, Robert A. Harris, Sep. 23, 2011. (21 pages).
International Search Report for PCT/US2015/024810, Jul. 8, 2015. (13 pages).
European Search Report for Application No. 15167039.5, Sep. 8, 2015. (7 pages).
SandBox Logistics, "Mine to Wellhead Logistics," Houston, TX, May 2013.
SandBox Logistics, LLC, screenshots from video made in Apr. 2013 and publicly shown in May 2013, Amegard, North Dakota.
International Search Report for PCT/US15/35635, Oct. 30, 2015. (12 pages).
PCT International Search Report for PCT/US15/49074, Dec. 17, 2015. (11 pages).
PCT International Search Report for PCT/US15/57601, May 6, 2016. (11 pages).
SandBox Logistics, LLC, screenshots from video dated Sep. 19, 2013.
SandBox Logistics, LLC, screenshots from video dated Aug. 22, 2014.
SandBox Logistics, LLC, screenshots from video dated Oct. 11, 2013.
SandBox Logistics, LLC, screenshots from video dated Apr. 10, 2013.
Grit Energy Solutions, LLC, Fidelity, Screenshots from video dated May 16, 2014.
Grit Energy Solutions, LLC, Gate, Screenshots from video dated Dec. 6, 2013, https://www.youtube.com/user/gritstack.
Grit Energy Solutions, LLC, Screen, Screenshots from video dated Dec. 6, 2013, https://www.youtube.com/user/gritstack.
Grit Energy Solutions, LLC, The Grit Stack System—Live Frac, Screenshots from video dated Jun. 15, 2015, https://www.youtube.com/user/gritstack.
Grit Energy Solutions, LLC, The Grit Stack System, Screenshots from video dated Feb. 7, 2014, https://www.youtube.com/user/gritstack.
Frac Sand Primer by Brian D. Olmen, Kelrick, LLC, from Hydraulic Fracturing by Michael Berry Smith and Carl Montgomery (CRC Press, Dec. 16, 2015), p. 384.
Premier Silica LLC, Sands Application in the Energy Market, Irving, TX, Copyright 2016.
Getty, John, Montana Tech; ASTM International, Overview of Proppants and Existing Standards and Practices, Jacksonville, FL, Jan. 29, 2013.
Arrows Up, Inc., Jumbo BTS—Bulk Transport System, Aug. 1, 2014.
Arrows Up, Inc., Reusable Packaging Association, Member Spotlight: John Allegretti, President & CEO, Arrows Up, Inc., Jun. 23, 2016.
Seed Today, Arrows Up, Inc. Bulk Transport System (BTS), Country Journal Publishing Co., Decatur, IL, Mar. 2, 2011.
SeedQuest, Arrows Up, Inc. launches innovative bulk transport system for see, Barrington, IL, Mar. 2, 2011.
Monster Tanks, Inc., Sand Monster Website, http://monstertanksinc.com/sandmonster.html, 2012.
Solaris Oilfield Infrastructure, Mobile Sand Silo System, 2016.
Final Office Action Mailed Sep. 27, 2016 for co-pending U.S. Appl. No. 13/555,635.
Non-Final Office Action Mailed Mar. 23, 2016 for co-pending U.S. Appl. No. 13/555,635.
Final Office Action Mailed Jul. 30, 2015 for co-pending U.S. Appl. No. 13/555,635.
Non-Final Office Action Mailed Oct. 22, 2014 for co-pending U.S. Appl. No. 13/555,635.
Final Office Action Mailed Jun. 21, 2016 for co-pending U.S. Appl. No. 13/628,702.
Non-Final Office Action Mailed Feb. 23, 2016 for co-pending U.S. Appl. No. 13/628,702.
Final Office Action Mailed Sep. 22, 2015 for co-pending U.S. Appl. No. 13/628,702.
Non-Final Office Action Mailed Jul. 28, 2015 for co-pending U.S. Appl. No. 13/628,702.
Final Office Action Mailed Mar. 24, 2015 for co-pending U.S. Appl. No. 13/628,702.
Non-Final Office Action Mailed Sep. 18, 2014 for co-pending U.S. Appl. No. 13/628,702.
Final Office Action Mailed Jun. 27, 2016 for co-pending U.S. Appl. No. 14/831,924.
Non-Final Office Action Mailed Feb. 16, 2016 for co-pending U.S. Appl. No. 14/831,924.
Final Office Action Mailed Jun. 27, 2016 for co-pending U.S. Appl. No. 14/923,920.
Non-Final Office Action Mailed Feb. 9, 2016 for co-pending U.S. Appl. No. 14/923,920.
Final Office Action Mailed Sep. 15, 2016 for co-pending U.S. Appl. No. 14/943,111.
Non-Final Office Action Mailed Apr. 5, 2016 for co-pending U.S. Appl. No. 14/943,111.
Final Office Action Mailed Jul. 18, 2016 for co-pending U.S. Appl. No. 14/948,494.
Non-Final Office Action Mailed Apr. 8, 2016 for co-pending U.S. Appl. No. 14/948,494.
Non-Final Office Action Mailed Sep. 6, 2016 for co-pending U.S. Appl. No. 15/144,296.

(56) References Cited

OTHER PUBLICATIONS

Non-Final Office Action Mailed Jul. 25, 2016 for co-pending U.S. Appl. No. 13/660,855.
Final Office Action Mailed Apr. 28, 2016 for co-pending U.S. Appl. No. 13/660,855.
Non-Final Office Action Mailed Oct. 6, 2015 for co-pending U.S. Appl. No. 13/660,855.
Final Office Action Mailed Aug. 6, 2015 for co-pending U.S. Appl. No. 13/660,855.
Non-Final Office Action Mailed Apr. 29, 2015 for co-pending U.S. Appl. No. 13/660,855.
Final Office Action Mailed Dec. 17, 2014 for co-pending U.S. Appl. No. 13/660,855.
Non-Final Office Action Mailed Sep. 4, 2014 for co-pending U.S. Appl. No. 13/660,855.
Final Office Action Mailed Sep. 24, 2013 for co-pending U.S. Appl. No. 13/660,855.
Non-Final Office Action Mailed May 14, 2013 for co-pending U.S. Appl. No. 13/660,855.
Non-Final Office Action Mailed Jul. 5, 2016 for co-pending U.S. Appl. No. 14/996,362.
Non-Final Office Action Mailed Jul. 6, 2016 for co-pending U.S. Appl. No. 15/144,450.
Final Office Action Mailed Sep. 29, 2016 for co-pending U.S. Appl. No. 13/768,962.
Non-Final Office Action Mailed Apr. 5, 2016 for co-pending U.S. Appl. No. 13/768,962.
Final Office Action Mailed Oct. 9, 2015 for co-pending U.S. Appl. No. 13/768,962.
Non-Final Office Action Mailed May 1, 2015 for co-pending U.S. Appl. No. 13/768,962.
Non-Final Office Action Mailed Jul. 18, 2016 for co-pending U.S. Appl. No. 15/152,744.
Non-Final Office Action Mailed Apr. 13, 2016 for co-pending U.S. Appl. No. 14/738,485.
Non-Final Office Action Mailed Sep. 7, 2016 for co-pending U.S. Appl. No. 14/841,942.
Final Office Action Mailed May 12, 2016 for co-pending U.S. Appl. No. 14/841,942.
Non-Final Office Action Mailed Nov. 30, 2015 for co-pending U.S. Appl. No. 14/841,942.
Non-Final Office Action Mailed Jul. 21, 2016 for co-pending U.S. Appl. No. 15/083,596.
Non-Final Office Action Mailed Aug. 19, 2016 for co-pending U.S. Appl. No. 15/084,613.
Non-Final Office Action Mailed Sep. 6, 2016 for co-pending U.S. Appl. No. 15/143,942.
Final Office Action Mailed Sep. 1, 2016 for co-pending U.S. Appl. No. 14/848,447.
Non-Final Office Action Mailed Apr. 8, 2016 for co-pending U.S. Appl. No. 14/848,447.
Non-Final Office Action Mailed May 13, 2016 for co-pending U.S. Appl. No. 14/986,826.
Final Office Action Mailed Sep. 15, 2016 for co-pending U.S. Appl. No. 14/922,836.
Non-Final Office Action Mailed Feb. 4, 2016 for co-pending U.S. Appl. No. 14/922,836.
Final Office Action Mailed Aug. 25, 2016 for co-pending U.S. Appl. No. 14/927,614.
Non-Final Office Action Mailed Mar. 1, 2016 for co-pending U.S. Appl. No. 14/927,614.
Non-Final Office Action Mailed Apr. 29, 2016 for co-pending U.S. Appl. No. 14/943,182.
Final Office Action Mailed Sep. 15, 2016 for co-pending U.S. Appl. No. 14/882,973.
Non-Final Office Action Mailed Feb. 11, 2016 for co-pending U.S. Appl. No. 14/882,973.
Non-Final Office Action Mailed Aug. 11, 2016 for co-pending U.S. Appl. No. 13/625,675.
Final Office Action Mailed Nov. 11, 2015 for co-pending U.S. Appl. No. 13/625,675.
Non-Final Office Action Mailed Mar. 11, 2015 for co-pending U.S. Appl. No. 13/625,675.
Non-Final Office Action Mailed Oct. 27, 2016 for co-pending U.S. Appl. No. 15/219,676.
Non-Final Office Action Mailed Nov. 9, 2016 for co-pending U.S. Appl. No. 14/948,494.
Final Office Action Mailed Nov. 4, 2016 for co-pending U.S. Appl. No. 14/738,485.
Non-Final Office Action Mailed Dec. 28, 2016 for co-pending U.S. Appl. No. 13/628,702.
Non-Final Office Action Mailed Jan. 13, 2017 for co-pending U.S. Appl. No. 14/923,920.
Final Office Action Mailed Jan. 12, 2017 for co-pending U.S. Appl. No. 14/841,942.
Non-Final Office Action Mailed Dec. 23, 2016 for co-pending U.S. Appl. No. 14/485,686.
Non-Final Office Action Mailed Jan. 27, 2017 for co-pending U.S. Appl. No. 14/485,687.
Non-Final Office Action Mailed Dec. 20, 2016 for co-pending U.S. Appl. No. 14/831,924.
Final Office Action Mailed Jan. 19, 2017 for co-pending U.S. Appl. No. 13/660,855.
Final Office Action Mailed Nov. 25, 2016 for co-pending U.S. Appl. No. 15/152,744.
Non-Final Office Action Mailed Dec. 15, 2016 for co-pending U.S. Appl. No. 14/848,447.
Non-Final Office Action Mailed Dec. 9, 2016 for co-pending U.S. Appl. No. 14/927,614.
International Search Report for PCT Application No. PCT/US2016/050859 mailed Dec. 9, 2016.

* cited by examiner

PROPPANT STORAGE VESSEL AND ASSEMBLY THEREOF

RELATED APPLICATIONS

The present application is a continuation of, is related to and claims priority to, and the benefit of, U.S. Non-Provisional application Ser. No. 15/191,578, filed Jun. 24, 2016, titled "Proppant Storage Vessel and Assembly Thereof," which is a continuation of U.S. Non-Provisional application Ser. No. 14/831,905, filed Aug. 21, 2015, titled "Proppant Storage Vessel and Assembly Thereof," now U.S. Pat. No. 9,403,626, issued Aug. 2, 2016, which is a continuation of U.S. Non-Provisional application Ser. No. 13/949,693, filed Jul. 24, 2013, titled "Proppant Storage Vessel and Assembly Thereof," now U.S. Pat. No. 9,296,518, issued Mar. 29, 2016 which is a continuation-in-part of U.S. Non-Provisional application Ser. No. 13/660,840, filed Oct. 25, 2012, titled "Proppant Storage Vessel and Assembly Thereof," now U.S. Pat. No. 8,505,780, issued Aug. 13, 2013, which is a continuation of U.S. Non-Provisional application Ser. No. 13/332,937, filed Dec. 21, 2011, titled "Proppant Storage Vessel and Assembly Thereof," now U.S. Pat. No. 8,827,118, issued Sep. 9, 2014, each of which are incorporated herein in their entireties by reference. This application is also a continuation of, is related to and claims priority to, and the benefit of, U.S. Non-Provisional application Ser. No. 15/191,592, filed Jun. 24, 2016, titled "Proppant Storage Vessel and Assembly Thereof," which is a continuation of U.S. Non-Provisional application Ser. No. 14/831,905, filed Aug. 21, 2015, titled "Proppant Storage Vessel and Assembly Thereof," now U.S. Pat. No. 9,403,626, issued Aug. 2, 2016, which is a continuation of U.S. Non-Provisional application Ser. No. 13/949,693, filed Jul. 24, 2013, titled "Proppant Storage Vessel and Assembly Thereof," now U.S. Pat. No. 9,296,518, issued Mar. 29, 2016 which is a continuation-in-part of U.S. Non-Provisional application Ser. No. 13/660,840, filed Oct. 25, 2012, titled "Proppant Storage Vessel and Assembly Thereof," now U.S. Pat. No. 8,505,780, issued Aug. 13, 2013, which is a continuation of U.S. Non-Provisional application Ser. No. 13/332,937, filed Dec. 21, 2011, titled "Proppant Storage Vessel and Assembly Thereof," now U.S. Pat. No. 8,827,118, issued Sep. 9, 2014, each of which are incorporated herein in their entireties by reference.

BACKGROUND

1. Field of the Invention

The present invention relates to storage containers. More particularly, the present invention relates to storage container assemblies whereby a product in one container can flow to an interior volume of a lower container. Additionally, the present invention relates to containers that are suitable for the transport, storage and dispensing of proppants therefrom.

2. Description of Related Art

Hydraulic fracturing is the propagation of fractions in a rock layer caused by the presence of pressurized fluid. Hydraulic fractures may form naturally, in the case of veins or dikes, or may be man-made in order to release petroleum, natural gas, coal seam gas, or other substances for extraction. Fracturing is done from a wellbore drilled into reservoir rock formations. The energy from the injection of a highly-pressurized fracking fluid creates new channels in the rock which can increase the extraction rates and ultimate recovery of fossil fuels. The fracture width is typically maintained after the injection by introducing a proppant into the injected fluid. Proppant is a material, such as grains of sand, ceramic, or other particulates, that prevent the fractures from closing when the injection is stopped.

With the rise of hydraulic fracturing over the past decade, there is a steep climb in proppant demand. Global supplies are currently tight. The number of proppant suppliers worldwide has increased since 2000 from a handful to well over fifty sand, ceramic proppant and resin-coat producers.

By the far the dominant proppant is silica sand, made up of ancient weathered quartz, the most common mineral in the Earth's continental crust. Unlike common sand, which often feels gritty when rubbed between the fingers, sand used as a proppant tends to roll to the touch as a result of its round, spherical shape and tightly-graded particle distribution. Sand quality is a function of both deposit and processing. Grain size is critical, as any given proppant must reliably fall within certain mesh ranges, subject to downhole conditions and completion design. Generally, coarser proppant allows the higher flow capacity due to the larger pore spaces between grains. However, it may break down or crush more readily under stress due to the relatively fewer grain-to-grain contact points to bear the stress often incurred in deep oil- and gas-bearing formations.

Typically, in any hydraulic fracturing operation, a large amount of such proppant is required. Typically, it has been difficult to effectively store the proppant at the fracturing sites. Additionally, it has been found to be rather difficult to effectively transport the proppant to the desired location. Often, proppant is hauled to the desired locations on the back of trucks and is dumped onsite. Under such circumstances, the proppant is often exposed to adverse weather conditions. This will effectively degrade the quality of the proppant during its storage. Additionally, the maintenance of proppant in containers at the hydraulic fracturing site requires a large capital investment in storage facilities. Typically, the unloading of such storage facilities is carried out on a facility-by-facility basis. As such, there is a need to be able to effectively transport the proppant to and store the proppant in a desired location adjacent to the hydraulic fracturing location.

In the past, various patents have issued relating to storage and transport facilities. For example, U.S. Patent Publication No. 2008/0179054, published on Jul. 31, 2008 to McGough et al., shows a bulk material storage and transportation system. In particular, the storage system is mounted on the trailer of a truck. The storage system includes walls that define an interior volume suitable for receiving the aggregate material therein. There are hoppers provided at the bottom of the container. These hoppers have inclined walls. The hoppers can extend so as to allow the material from the inside of the container to be properly conveyed to a location exterior of the container. Actuators are used so as to expand and collapse the container.

U.S. Pat. No. 7,240,681, issued on Jul. 10, 2007 to L. Saik, describes a trailer-mounted mobile apparatus for dewatering and recovering formation sand. The trailer is mounted to a truck-towable trailer so as to receive sand therein. The container has a pair of sloping end walls. The back end of the container is suitably openable so as to allow the sand to be removed therefrom. A pneumatic or hydraulic ram is provided on the forward part of the container so as to allow the container to be lifted angularly upwardly so as to allow sand to be discharged through the gate at the rear of the container.

U.S. Pat. No. 4,247,228, issued on Jan. 27, 1981 to Gray et al., describes a dump truck or trailer with a pneumatic conveyor. The container is mounted to a frame on wheels. A hydraulic ram tilts the container for dumping through a rear outlet. A pneumatic conveyor is carried by the frame with an intake at the rear of the container. A gate allows the solids to be dumped conventionally by gravity or to be blown to a storage facility by the pneumatic container. The container has a top hatch formed therein so as to allow the solids to be introduced into the interior of the container.

U.S. Pat. No. 2,865,521, issued on Dec. 23, 1958 to Fisher et al., shows a bulk material truck that has an interior volume suitable for the receipt of bulk material therein. A pneumatic conveyer is utilized so as to allow the removal of such material from the bottom of the container. A pair of sloping walls are provided on opposite sides of the container so as to allow the bulk material within the container to be passed toward the bottom of the container. A top hatch is provided on the top of the conveyer. The pneumatic conveyer is connected to the bottom of the container.

It is an object of the present invention to provide a proppant storage vessel that allows proppant to be easily transported and stored.

It is another object of the present invention to provide a proppant storage vessel that allows the proppant that is contained within the storage vessel to be easily and efficiently discharged through the bottom thereof.

It is another object of the present invention to provide a proppant storage assembly which allows for the effective storage of proppant at the fracturing site.

It is another object of the present invention to provide a proppant storage assembly which allows proppant to be efficiently removed from a stacked configuration of containers.

These and other objects and advantages of the present invention will become apparent from a reading of the attached specification and appended claims.

BRIEF SUMMARY OF THE INVENTION

The present invention is a proppant storage vessel that comprises a container having a first end wall, a second end wall, a first side wall and a second side wall. The container also has a top wall and a bottom wall which serve to define an interior volume therein. A hatch is formed on the bottom wall of the container. The bottom hatch is movable between an open position and a closed position. A first inclined surface is positioned in the interior volume. The first inclined surface extends from the first end wall to the bottom hatch. A second inclined surface extends from the second end wall toward the bottom hatch. A third inclined surface extends from the first side wall toward the bottom hatch. A fourth inclined surface extends from the second side wall toward the bottom hatch. The walls have a rigidity suitable for containing at least 30,000 pounds of proppant therein. The container can have up to 100,000 pounds of proppant therein.

A top hatch formed on the top wall. The top hatch is movable between an open position and a closed position.

Each of the first and second end walls and the first and second side walls have a middle. The first inclined surface has an upper end affixed to the first end wall below the middle thereof. The second inclined surface has an upper end affixed to the second end wall below the middle thereof. The third inclined surface has an upper end affixed to the first side wall below the middle thereof. The fourth inclined surface has an upper end thereof affixed to the second side wall below the middle thereof.

A first support brace is affixed to the first and second end walls and extends therebetween. A second support brace is affixed to the first and second side walls and extends therebetween. A first support member has one end affixed to the bottom wall and extends angularly upwardly. The first support member has an opposite end affixed centrally to the first inclined surface. A second support member has one end affixed to the bottom wall and extends angularly upwardly therefrom. The second support member has an opposite end affixed centrally to the second inclined surface. Each of the first, second, third and fourth inclined surfaces has a bottom edge positioned adjacent a perimeter of the bottom hatch. The bottom hatch is hingedly affixed to the bottom wall. The bottom hatch resides against the bottom wall when in the closed position.

The present invention is also a proppant storage assembly that comprises a first container having an interior volume and a second container supported in spaced relation above the first container. The first container has a bottom wall having a bottom hatch affixed thereto. The hatch is movable between an open position and a closed position. The first container has an opening at a top wall thereof. The second container has bottom hatch formed on a bottom wall thereof. The bottom hatch of the second container is aligned with the opening of the first container such that a proppant in the first container can flow through the hatch thereof into the interior volume of the first container.

In particular, the first container has a top hatch hingedly affixed at the opening thereof. The top hatch of the first container is movable between a closed position and an open position. The bottom hatch of the second container has a length dimension. The length dimension is slightly less than a distance between the first container and the second container. The top hatch of the first container extends in parallel relation to the bottom hatch of the second container when each of the top hatch of the first container and the bottom hatch of the second container are in the open position.

A first spacer is positioned on the top wall of the first container and extends upwardly therefrom. The first spacer abuts the bottom wall of the second container. A second spacer is positioned on the top wall of the first container and extends upwardly therefrom. The second spacer abuts the bottom wall of the second container. The first spacer is in spaced relation to the second spacer. A pad is positioned against the bottom wall of the first container. The pad supports the bottom wall of the first container a desired distance above an underlying surface. The bottom hatch of the first container has a length dimension. This length dimension is less than a desired distance between the bottom wall and the underlying surface. As such, a portable conveyer can be placed thereunder. The portable container has a surface positioned between the bottom wall of the first container and the underlying surface. The surface of the portable container is directly below the bottom hatch of the first container.

Each of the first and second containers has a first end wall, a second end wall, a first side wall and a second side wall. A first inclined surface is positioned in the interior volume of the container so as to extend from the first end wall toward the bottom hatch. A second inclined surface is positioned in the interior volume of the container so as to extend from the second end wall toward the bottom hatch. A third inclined surface is positioned in the interior volume so as to extend from the first side wall toward the bottom hatch. A fourth inclined surface is positioned in the interior volume so as to extend from the second side wall toward the bottom hatch.

A third container can be supported in spaced relation above the second container. The second container has a top hatch formed on a top wall thereof. The third container has a bottom hatch formed on a bottom wall thereof. The bottom hatch of the third container is aligned with the top hatch of the second container. Each of the containers is ocean freight container.

In an alternative embodiment of the present invention, the first container has the first side wall, a second side wall, a first end wall and second end wall hingedly mounted to the bottom wall thereof. A first slot and a second slot are affixed to the bottom wall of the container. The first and second slots are suitable for the receipt of forks of a forklift therein.

The foregoing Summary of the Invention is intended to describe, in summary, the preferred embodiments of the present invention. However, this section is not intended, in any way, to limit the scope of the present invention. The scope of the present invention should be defined by the claims herein and their legal equivalents.

DETAILED DESCRIPTION OF THE INVENTION

Figure 1:
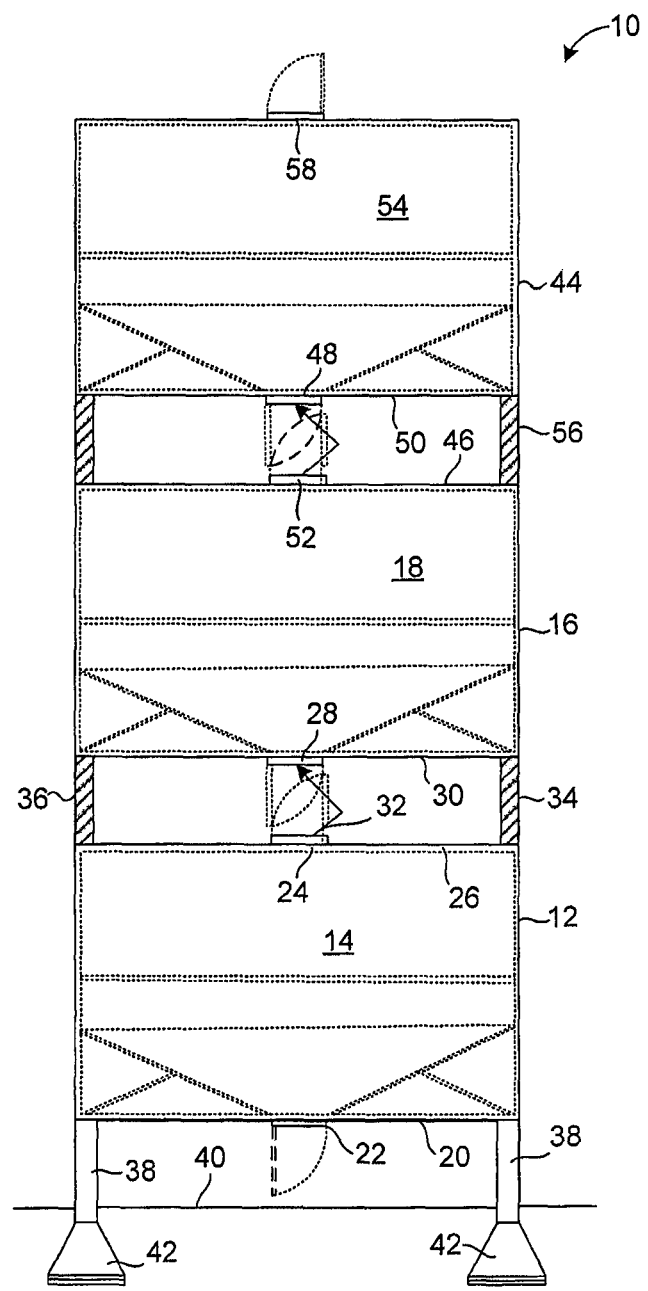
FIG. 1 is a side elevational view of the proppant storage assembly in accordance with the preferred embodiment of the present invention.

Referring to FIG. 1, there is shown the proppant storage assembly 10 in accordance with the preferred embodiment of the present invention. The proppant storage assembly 10 includes a first container 12 having an interior volume 14 and a second container 16 having a interior volume 18. The first container 12 is in spaced relationship to the second container 16. The first container 12 has a bottom wall 20. The bottom wall 20 has a bottom hatch 22 affixed thereto. The hatch 22 is movable between a closed position and an open position (illustrated in broken line fashion). The first container 12 has an opening 24 at a top wall 26 thereof. The second container 16 has a hatch 28 formed on a bottom wall 30 thereof. The bottom hatch 28 of the second container 16 is shown as aligned with the opening 26 of the first container 12 such that a proppant within the second container 16 can flow through the hatch 28 into the interior volume 14 of the first container 12.

In particular, in FIG. 1, it can be seen that the first container 12 has a hatch 32 extending over the opening 24 thereof. In particular, the hatch 32 is hingedly mounted to the top wall 26 of the first container 12 so as to be movable between a closed position and an open position (illustrated in broken-line fashion). In particular, the bottom hatch 28 of the second container 16 will extend downwardly perpendicularly to the bottom wall 30. Similarly, the top hatch 32 of the first container 12 will extend upwardly in generally transverse relationship to the top wall 26. The hatches 28 and 32 will be in generally parallel relationship in this configuration. As such, the hatches 24 and 28 will form a unique and guided flowpath whereby the proppant in the interior volume 18 of the second container 16 can flow directly into the opening 24 and into the interior volume 14 of the first container 12. The length dimension of the hatches 28 and 32 will be less than the distance between the top wall 26 of the first container 12 and the bottom wall 30 of the second container 16.

A first spacer 34 is positioned on the top wall 26 of the first container 12 and extends upwardly therefrom. The first spacer 34 abuts the bottom wall 30 of the second container 16. A second spacer 36 is positioned on the top wall 26 of the first container 12 and extends upwardly therefrom. The second spacer 36 abuts the bottom wall 30 of the second container 16. The first spacer 34 is in spaced relationship to the second spacer 36. The spacers 34 and 36 serve to assure a proper distance between the containers 12 and 16 whereby the hatches 28 and 32 can be properly opened so as to allow for the flow of proppant therebetween. A pad 38 is positioned against the bottom wall 20 of the first container 12. The pad 38 serves to support the first container 12 above an underlying surface 40 (such as the earth). It can be seen that the pad 38 is in the nature of a concrete structure that has a base 42 embedded into the earth. As such, the pad 38 is configured so as to rigidly support the containers 12 and 16 in their desired positions above the earth.

Pad 38 support the container 12 in a suitable distance above the underlying surface 40 such that the hatch 22 can move from its closed position to its open position while allowing a certain amount of space therebetween. As a result, a portable conveyer can be placed below the bottom hatch 22 so as to allow the proppant within the interior volume 14 to be discharged therefrom.

A third container 44 is supported in spaced relationship above the top wall 46 of the second container 16. As can be seen, the third container has a bottom hatch 48 located on the bottom wall 50 thereof. The top wall 46 has a top hatch 52 hingedly connected thereto. As a result, when the bottom hatch 48 is opened and the top hatch 52 is opened (as illustrated in broken-line fashion), the proppant within the interior volume 54 of the third container 44 can flow directly into the interior volume 18 of the second container 16. Suitable spacers 56 serve to support the bottom wall 50 of the third container 44 a proper distance above the top wall 46 of the second container 16. Third container 44 also has a top hatch 58 that is movable between a closed position and an open position (illustrated in broken-line fashion).

In the configuration shown in FIG. 1, volumes of proppants can be easily stored at the fracturing site. It is only necessary to stack each of the containers 12, 16 and 44 upon one another in the manner described in FIG. 1. Each of the containers 12, 16 and 44 has an exterior configuration similar to that of an ocean freight container. As such, these containers can be easily transported on the bed of a truck, on a freight train or on a ship to the desired location. Because of this stacking arrangement, special proppant storage facilities are not required at the fracturing site. Each of the hatches 28, 32, 48, 52 and 58 can be in a liquid-tight sealing relationship over the respective openings thereof when in the closed position. As such, the arrangement illustrated in FIG. 1 of the proppant storage assembly 10 can avoid any liquid intrusion into the proppant contained within each of the containers 12, 16 and 44. Typically, a forklift, or other lifting device, can be utilized so as to properly stack the containers. Within the concept of the present invention, two containers, three containers, or more can be utilized in the construction of the proppant storage assembly 10. Each of the containers 12, 16 and 44 has an interior structure in the nature illustrated in FIGS. 3-6 herein, as will be described hereinafter. The present invention provides a suitably modular arrangement whereby a proppant storage facility can be easily constructed on-site. After the fracturing operation is completed, the containers can be easily removed from this stacked configuration and transported to another location. Similarly, if desired, the containers 12, 16 and 44 can be suitably replaced by another container so as to provide the desired proppant to the fracturing site.

Figure 2:
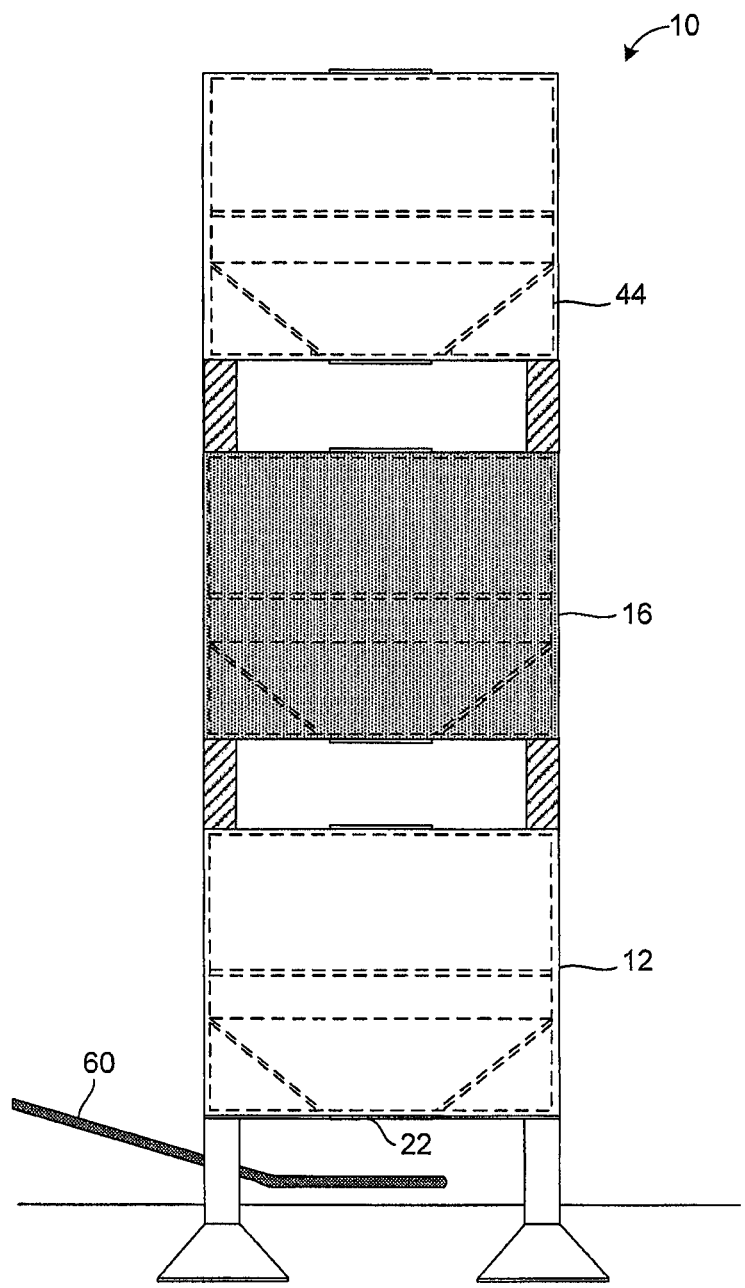
FIG. 2 is an end view of the proppant storage assembly of the present invention showing, in particular, the portable conveyer located at a bottom thereof.

FIG. 2 shows an end view of the proppant storage assembly 10 of the present invention showing of the present invention. In FIG. 2, it can be seen that the first container 12 is spaced from the second container 16. The second container 16 is suitably spaced from the third container 44. The bottom hatch 22 of the first container is openable so that the proppant within the first container 12 can be discharged through the hatch 22 onto a portable conveyer 60. The portable conveyer 60 can be easily transported to a location below the hatch 22 of the first container 12 so as to allow the proppant from the containers to be transported to another location. Each of the containers 12, 16 and 44 is vertically aligned in a stacked orientation. The first container has a capacity for storing 100,000 pounds of proppant. The second container 16 and the third container 44 can store 30,000 pounds of proppant. As such, a very large amount of proppant can be provided to the fracturing site, in a simple easy and convenient manner.

Figure 3:
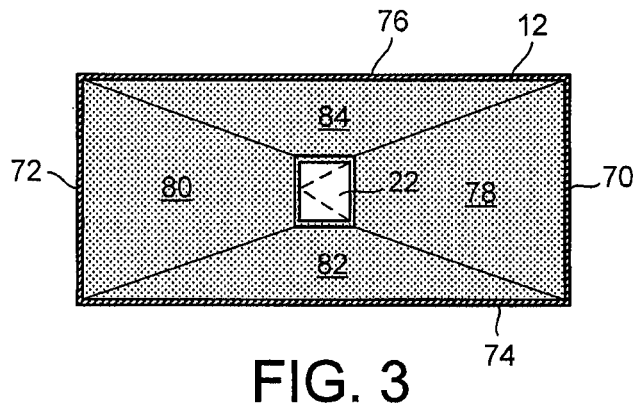
FIG. 3 is a transparent plan view of the proppant storage container in accordance with the preferred embodiment of the present invention.

FIG. 3 illustrates the interior construction of the first container 12. The top wall of the first container 12 has been removed for the purposes of illustration. The container 12 has a first end wall 70, a second end wall 72, a first side wall 74 and a second side wall 76. The end walls 70 and 72 extend between the side walls 74 and 76 so as to define the interior volume of the first container 12. A first inclined surface 78 extends from the first end wall 70 to the bottom hatch 22. A second inclined surface 80 extends from the second end wall 72 toward the bottom hatch 22. A third inclined surface 82 extends from the first side wall 74 toward the bottom hatch 22. Similarly, a fourth inclined surface 84 extends from the second side wall 76 toward the bottom hatch 22. Lower ends of each of the inclined surface 78, 80, 82 and 84 are aligned with the perimeter of the bottom hatch 22. The inclining of the side walls 78, 80, 82 and 84 serves to assure that the proppant contained within the interior volume thereof is suitably funneled toward the bottom hatch 22. Each of the inclined surface 78, 80, 82 and 84 is has a smooth surface so that a constant flow of proppant can occur.

Figure 4:
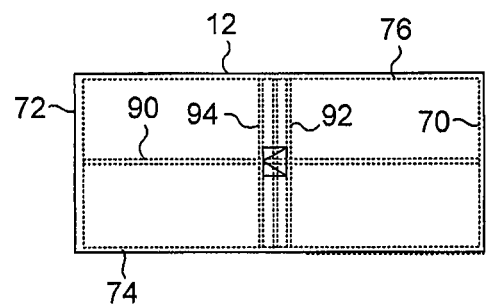
FIG. 4 is a plan view showing of the proppant storage container of the present invention.

FIG. 4 illustrates the bracing associated with the first container 12 so as to assure the structural integrity of the container. As can be seen, a first support brace 90 is affixed to the first end wall 70 and extends across the interior volume of the container 12 to the second end wall 72. The first support brace 90 is suitably welded to the end walls 70 and 72 so as to provide a rigid structural support therebetween. A second support brace 92 has one end affixed to the side wall 74 and an opposite end affixed to the side wall 76. The second support brace 92 extends transversely to the first support brace 90. The second support brace 92 provides a rigid support for the side walls 74 and 76. The first support brace 90 and the second support brace 92 structurally enhance the strength of the container 12 so as to as to withstand the weight of the proppant that is contained therein. The second support brace 92 can also include another support brace 94 extending between the side walls 74 and 76 in generally parallel relationship to the first support brace 90. Within the concept of the present invention, various other support braces, in the nature of angle irons, can be utilized so as to suitably support the structure of the container 12.

Figure 5:
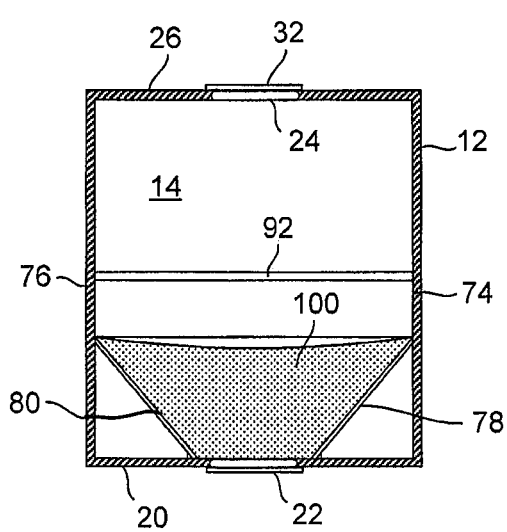
FIG. 5 is a cross-sectional view as taken from an end of the proppant storage container of the present invention.

FIG. 5 illustrates a cross-sectional view of the container 12. As can be seen, the container 12 has the bottom hatch 22 located on the bottom wall 20 thereof. A top hatch 32 is hingedly mounted to the top wall 26 thereof. Hatch 32 serves to cover the opening 24 in the top wall 26. The bottom hatch 22 is hingedly mounted to the bottom surface of the bottom wall 20 and can be suitably latched to the bottom wall 20 so as to retain the proppant 100 therein. The container 12 has its side walls 74 and 76 extending vertically upwardly from the bottom wall 20. The first inclined surface 78 and the second inclined surface 80 are illustrated as funneling the proppant 100 toward the bottom hatch 22. The first inclined surface 78 has one end mounted adjacent to hatch 22 and an opposite end affixed to the side wall 74. In particular, the inclined surface 78 has its opposite end at the side wall 74 located below the middle of the side wall 74. Similarly, the second inclined surface 80 extends from the hatch 22 toward the side wall 76 at a location below the middle of the side wall 76. The second support brace 92 is illustrated as extending across the interior volume 14 of the first container 12 between the side walls 74 and 76.

Figure 6:
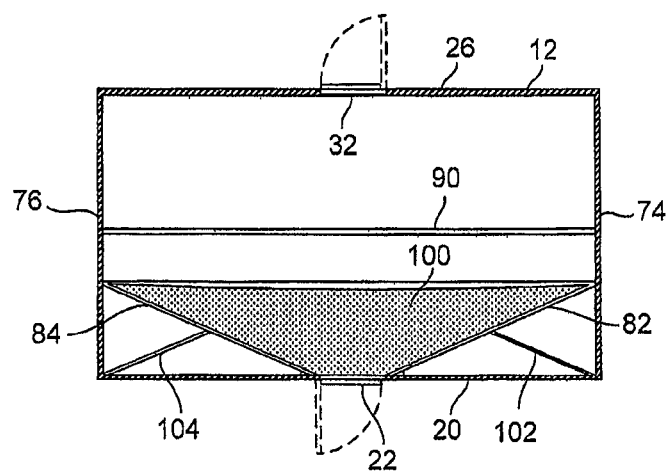
FIG. 6 is cross-sectional view as taken across a side of the proppant storage container of the present invention.

FIG. 6 shows another cross-sectional view of the first container 12. First container 12 is illustrated also as having the top hatch 32 hingedly mounted to the top wall 26 and the bottom hatch 22 hingedly mounted to the bottom wall 20. The third inclined surface 82 extends from the bottom hatch 22 to the side wall 74. The fourth inclined surface 84 extends from the bottom hatch 22 toward the side wall 76. Each of the ends of the inclined surfaces 82 and 84 will joined to the respective walls 74 and 76 at a location below the middle of each of the side walls 74 and 76. The first support brace 90 extends between the side walls 74 and 76 so as to provide structural integrity.

In FIG. 6, there is a first support member 102 that extends from the bottom wall 20 upwardly toward a location centrally of the third inclined surface 82. Another support member 104 extends from the bottom wall 20 upwardly toward a center of the fourth inclined surface 84. These support members 102 and 104 enhance the strength of the inclined surface 82 and 84 so as to withstand the weight and forces imparted thereto by the proppant 100.

Figure 7:
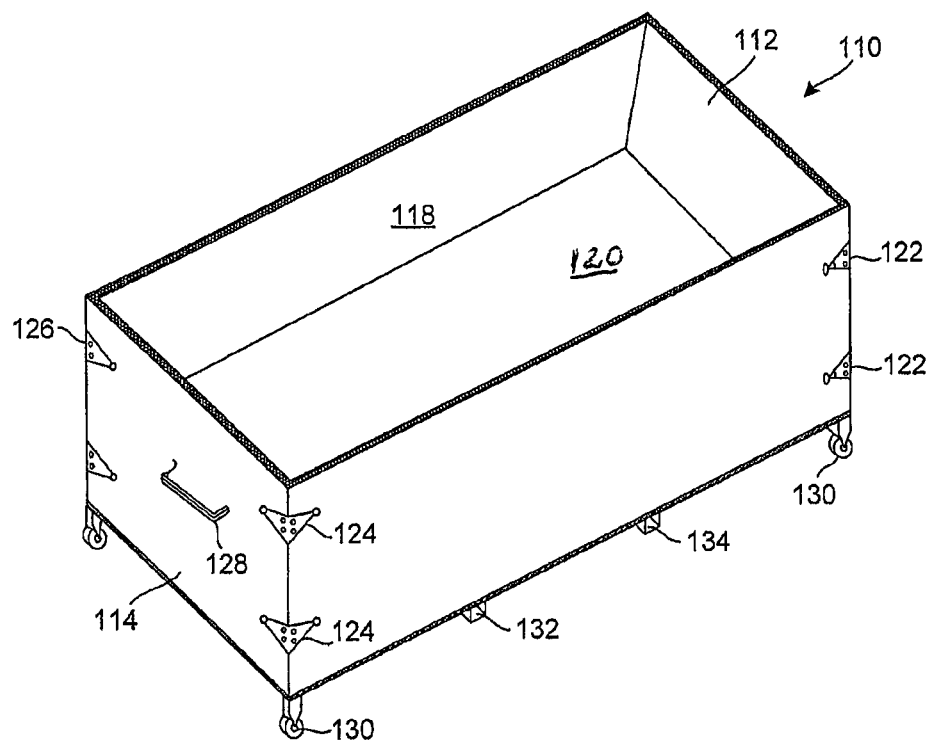
FIG. 7 is a perspective view of an alternative embodiment of the proppant storage container of the present invention.

FIG. 7 shows an alternative embodiment of the container 110 of the present invention. Container 110 includes a first end wall 112, a second end wall 114, a first side wall 116, and a second side wall 118. Each of the end walls 112 and 114 and each of the side walls 116 and 118 are illustrated as extending upwardly from a bottom wall 120.

Within concept shown in FIG. 7, each of the end walls 112 and 114 and each of the side walls 116 and 118 are hingedly mounted to the bottom wall 120. It can be seen that there are latch members 122, 124 and 126 that serve to secure the walls 112, 114, 116 and 118 in their upright configuration. Latch members 122 join the side wall 116 to the end 112. Latch members 124 join the side wall 116 to the end walls 114. Latch members 126 secure the end wall 114 to the side walls 118. An additional latch member (not illustrated) will secure the end wall 112 to the side wall 118. As such, the structure of the container 110 can be in a sand-receiving orientation.

Importantly, since each of the walls 112, 114, 116 and 118 are hingedly secured to the bottom wall 120, the walls can be pivoted about the hinges so as to overlie the bottom 112 once the latch members 122, 124 and 126 are released. A handle 128 is provided on the end walls 112 and 114 so as to allow the container 110 to be moved, as desired. Wheels 130 extend downwardly from the bottom wall 120 so as to allow the container 110 to be rolled to a desired position.

In FIG. 7, there is first slot 132 and a second slot 134 formed on the bottom of the bottom surface 120. Slots 132 and 134 allow for the receipt of the forks of a forklift therein. As such, the container 110 can be moved to a desired location in a simple and efficient manner.

The present application is a continuation of, is related to and claims priority to, and the benefit of, U.S. Non-Provisional application Ser. No. 15/191,578, filed Jun. 24, 2016, titled "Proppant Storage Vessel and Assembly Thereof," which is a continuation of U.S. Non-Provisional application Ser. No. 14/831,905, filed Aug. 21, 2015, titled "Proppant Storage Vessel and Assembly Thereof," now U.S. Pat. No. 9,403,626, issued Aug. 2, 2016, which is a continuation of U.S. Non-Provisional application Ser. No. 13/949,693, filed Jul. 24, 2013, titled "Proppant Storage Vessel and Assembly Thereof," now U.S. Pat. No. 9,296,518, issued Mar. 29, 2016 which is a continuation-in-part of U.S. Non-Provisional application Ser. No. 13/660,840, filed Oct. 25, 2012, titled "Proppant Storage Vessel and Assembly Thereof," now U.S. Pat. No. 8,505,780, issued Aug. 13, 2013, which is a continuation of U.S. Non-Provisional application Ser. No. 13/332,937, filed Dec. 21, 2011, titled "Proppant Storage Vessel and Assembly Thereof," now U.S. Pat. No. 8,827,118, issued Sep. 9, 2014, each of which are incorporated herein in their entireties by reference. This application is also a continuation of, is related to and claims priority to, and the benefit of, U.S. Non-Provisional application Ser. No. 15/191,592, filed Jun. 24, 2016, titled "Proppant Storage Vessel and Assembly Thereof," which is a continuation of U.S. Non-Provisional application Ser. No. 14/831,905, filed Aug. 21, 2015, titled "Proppant Storage Vessel and Assembly Thereof," now U.S. Pat. No. 9,403,626, issued Aug. 2, 2016, which is a continuation of U.S. Non-Provisional application Ser. No. 13/949,693, filed Jul. 24, 2013, titled "Proppant Storage Vessel and Assembly Thereof," now U.S. Pat. No. 9,296,518, issued Mar. 29, 2016 which is a continuation-in-part of U.S. Non-Provisional application Ser. No. 13/660,840, filed Oct. 25, 2012, titled "Proppant Storage Vessel and Assembly Thereof," now U.S. Pat. No. 8,505,780, issued Aug. 13, 2013, which is a continuation of U.S. Non-Provisional application Ser. No. 13/332,937, filed Dec. 21, 2011, titled "Proppant Storage Vessel and Assembly Thereof," now U.S. Pat. No. 8,827,118, issued Sep. 9, 2014, each of which are incorporated herein in their entireties by reference.

The foregoing disclosure and description of the invention is illustrative and explanatory thereof. Various changes in the details of the illustrated construction can be made within the scope of the appended claims without departing from the true spirit of the invention. The present invention should only be limited by the following claims and their legal equivalents.

We claim:

1. A container structurally strengthened to transport and store large volumes of proppant effectively therein to supply to a fracturing site, the container comprising:
  a top region;
  a bottom region having an outlet formed therein;
  a plurality of sidewalls connected to and extending at least partially between the top region and bottom region, so as to define an interior volume within the container thereby to store the proppant therein;
  a plurality of sidewall supports positioned to provide structural support to the sidewalls when large volumes of proppant are positioned within the interior volume of the container, the proppant comprising sand having a substantially spherical shape and a tightly graded particle distribution, the plurality of sidewall supports including a plurality of support braces extending in a substantially horizontal position and positioned in direct contact with interior surfaces of the sidewalls to enhance support of the sidewalls when the container is filled with the proppant, the plurality of support braces includes a first set of support braces connected to a first pair of sidewalls and a second set of support braces connected to a second pair of sidewalls, the first set of support braces extending in a plane direction transverse to a plane direction of the second set of support braces;
  ramps downwardly inclined and extending inwardly from the sidewalls to direct the proppant toward the outlet in the bottom region when the proppant is stored therein, at least one support brace of the plurality of support braces being positioned vertically higher than the ramps;
  a hatch positioned proximate the outlet, the hatch being moveable between open and closed positions; and
  a container frame connected to the plurality of sidewalls and structurally arranged to support another container when filled with large volumes of proppant and when positioned in a vertically stacked arrangement thereabove, and the large volumes of proppant weighing at least 30,000 pounds.

2. The container of claim 1, wherein the container comprises a first container, and wherein the outlet is adapted to be positioned adjacent a second container having a second top region with an opening formed therein, the first container being adapted to discharge the proppant from the outlet and into a second interior volume of the second container.

3. The container of claim 1, further comprising a plurality of support members connected to a bottom surface of the ramps and extending downwardly toward the bottom region.

4. The container of claim 3, wherein the plurality of support members is arranged at respective angles relative to the bottom region and the support members are connected to the bottom region.

5. The container of claim 3, wherein at least one support member of the plurality of support members is positioned vertically lower than the plurality of support braces.

6. A system structurally strengthened to transport and store large volumes of proppant effectively therein, the system comprising:
  a first container comprising:
    a first top region,
    a first bottom region having a first outlet formed therein to allow large volumes of proppant to flow therefrom when the outlet is in an open position, the proppant comprising sand, the large volumes having a weight comprising at least 30,000 pounds of the sand,
    a first plurality of sidewalls connected to the first top region and first bottom region, so as to define a first interior volume of the first container thereby to store the proppant therein,
    a first plurality of structural supports positioned to provide structural support to the first plurality of sidewalls when large volumes of proppant are positioned within the first interior volume, the proppant having a substantially spherical shape and a tightly graded particle distribution, the first plurality of structural supports defining a first container frame connected to the first plurality of sidewalls and structurally arranged to support another container when filled with large volumes of proppant and when positioned in a vertically stacked arrangement thereabove, and a first plurality of ramps downwardly inclined and extending inwardly from the first plurality of sidewalls to direct the proppant toward the first outlet when the proppant is stored therein; and a second container positioned below the first container, the second container comprising:

a second top region, having an opening formed therein, a second bottom region, having a second outlet formed therein to allow large volumes of proppant to flow therefrom when in an open position, the proppant comprising sand, the large volumes having a weight comprising at least 30,000 pounds of the sand, a second plurality of sidewalls connected to the second top region and second bottom region, so as to define a second interior volume of the second container thereby to store the proppant therein, a second plurality of structural supports positioned to provide structural support to the second plurality of sidewalls when large volumes of proppant are positioned within the second interior volume, the proppant having a substantially spherical shape and a tightly graded particle distribution, the second plurality of structural supports defining a second container frame connected to the second plurality of sidewalls and structurally arranged to support another container when filled with large volumes of proppant and when positioned in a vertically stacked arrangement thereabove, a second plurality of ramps downwardly inclined and extending inwardly from the second plurality of sidewalls to direct the proppant toward the second outlet when the proppant is stored therein, the first container and the second container being vertically aligned in a stacked orientation; and one or more spacers positioned between the first container and the second container, the spacers being positioned to arrange the first and second containers in a spaced relationship.

7. The system of claim 6, wherein the first container further comprises a first hatch movable toward the second container to transition the first hatch to the open position to allow proppant to flow from the first outlet, wherein the second container further comprises a second hatch movable toward the first container to transition the second hatch to an open position, and a distance between the first and second containers is great enough to allow the first hatch and the second hatch to be in respective open positions at the same time.

8. The system of claim 6, further comprising a conveyor adapted to be positioned below either the first outlet or the second outlet such that proppant exiting the second container through the second outlet is deposited on the conveyor and transported away from the second container.

9. The system of claim 6, wherein each of the first plurality of structural supports and the second plurality of structural supports includes a first plurality of support braces, the first plurality of support braces comprises a first set of one or more support braces connected to a first pair of sidewalls and a second set of one or more support braces connected to a second pair of sidewalls, the first set of support braces extending in a planar direction transverse to the second set of support braces.

10. The system of claim 6, wherein the first container further comprises a plurality of support members attached to respective bottom surfaces of the first plurality of ramps, the plurality of support members extending downwardly toward the first bottom region to support the ramps, and the plurality of support members extend in a substantially horizontal position.

11. A method for delivering large volumes of proppant to a fracturing site, the method comprising:

positioning a first container to structurally support large volumes of proppant and being filled with large volumes of proppant near a fracturing site, the proppant comprising sand, the proppant comprising sand, the large volumes having a weight comprising at least 30,000 pounds of the sand, the first container having a first opening in a first top region with a first hatch moveable between a first open position and a first closed position, and a first outlet in a first bottom region to allow proppant to flow therefrom when in an open position and to prevent proppant to flow therefrom when in a closed position;

stacking a second container also to structurally support large volumes of proppant when positioned therein in a vertically stacked positioned above the first container, the second container being filled with large volumes of proppant having a weight comprising at least 30,000 pounds of sand, having a second opening in a second top of the second container with a second hatch moveable between a second open position and a second closed position, and having a second outlet in a second bottom of the second container to allow proppant to flow therefrom when in an open position;

positioning spacers between the first and second containers to provide space between the first container and the second container; and moving one or more of the first container and the second container to a position to allow proppant to flow from the first container onto a conveyor positioned at an elevation below a corresponding respective one or more of the first outlet and the second outlet of the corresponding respective one or more of the first container and the second container.

12. The method of claim 11, wherein the first and second containers each comprises a plurality of support braces positioned to provide structural support to the sidewalls.

13. The method of claim 11, comprising moving the one or more first container and second container when the one or more first container and second container is empty of the proppant and replacing the one or more first container and second container with a third container to structurally support large volumes of proppant therein and being filled with the large volumes of proppant, the third container having a third outlet formed in the bottom region thereof and being adapted positioned at an elevation to overlie the conveyor thereby to dispense the proppant through the third outlet and onto the conveyor.

14. The method of claim 13, wherein each of the first, second, and third containers includes a container frame structurally arranged to support another container when filled with large volumes of proppant and positioned in a vertically stacked arrangement thereabove such that each of the first and second containers is structurally adapted to support the other container when the proppant is positioned therein.

\* \* \* \* \*